United States Patent [19]

Sohn

[11] Patent Number: 4,888,077

[45] Date of Patent: Dec. 19, 1989

[54] METHOD OF MANUFACTURING AN ELECTROLUMINESCENCE DISPLAY DEVICE

[75] Inventor: Sang H. Sohn, Kumi, Rep. of Korea

[73] Assignee: Goldstar Co., Ltd., Seoul, Rep. of Korea

[21] Appl. No.: 88,684

[22] Filed: Aug. 24, 1987

[30] Foreign Application Priority Data

Aug. 26, 1986 [KR] Rep. of Korea ................. 7093/1986

[51] Int. Cl.[4] ............................................... B32B 31/06

[52] U.S. Cl. ....................................... 156/285; 29/836; 29/837; 29/841; 156/292; 156/293; 315/169.3; 340/781

[58] Field of Search ................. 29/835, 836, 837, 841; 313/582, 583; 350/330; 361/401; 340/718, 719, 781; 315/169.3, 169.4; 156/275.5, 285, 330, 292, 293

[56] References Cited

U.S. PATENT DOCUMENTS

| | | | |
|---|---|---|---|
| 4,042,861 | 8/1977 | Yasuda et al. | 361/400 |
| 4,222,635 | 9/1980 | Julke | 156/275.5 |
| 4,297,401 | 10/1981 | Chern et al. | 156/330 |
| 4,302,706 | 11/1981 | DuBois | 313/583 |
| 4,372,037 | 2/1983 | Scapple et al. | 29/841 |
| 4,506,193 | 3/1985 | Hope et al. | 315/169.3 |
| 4,682,414 | 7/1987 | Butt | 361/401 |

FOREIGN PATENT DOCUMENTS

| | | | |
|---|---|---|---|
| 2444409 | 4/1975 | Fed. Rep. of Germany | 315/169.4 |
| 33495 | 3/1977 | Japan | 340/719 |
| 2155229 | 9/1985 | United Kingdom | 315/169.4 |

*Primary Examiner*—Merrell C. Cashion, Jr.
*Attorney, Agent, or Firm*—Rosen, Dainow & Jacobs

[57] ABSTRACT

A method of manufacturing an electroluminescence display device capable of displaying a predetermined number of characters comprising a bare chip, a groove for fittingly receiving the bare chip, and a vacuumized space for protecting the bare chip from external influences. Epoxy resin is applied to the lower periphery of the groove and the bare chip having approximately same size as the groove is received in and spaced from the bottom of the groove. By providing a panel lead at the same height as an Al electrode of the bare chip, ultrasonic bonding of an Al or Au wire to the panel lead and electrode is easily achieved.

10 Claims, 3 Drawing Sheets

FIG, 1

FIG, 4
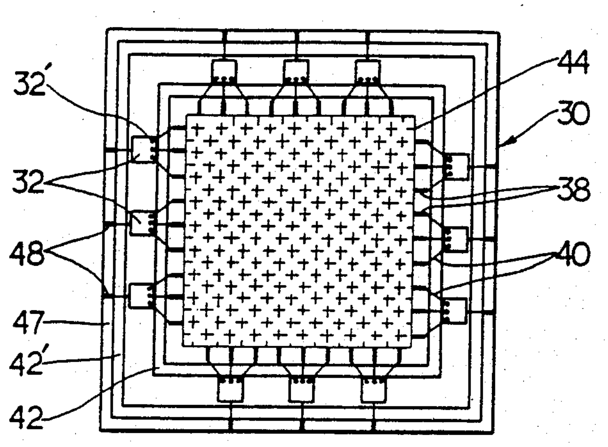
FIG, 5
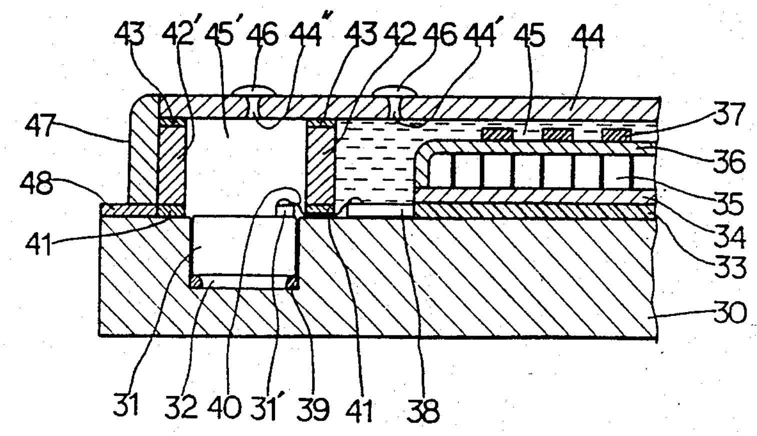

METHOD OF MANUFACTURING AN ELECTROLUMINESCENCE DISPLAY DEVICE

BACKGROUND OF THE INVENTION

1. Field of the Invention

The present invention relates to a method of manufacturing an electroluminescence display device capable of displaying a predetermined number of characters, more particularly to improvements in the method of manufacturing a Chip-On-Glass-type EL display device, in which bare integrated circuit, chips not packed in plastics, are directly attached on a glass plate.

2. Discussion of Related Art

In a known EL display device shown in FIG. 1, there is provided a display panel, capable of displaying a predetermined number of characters, which is attached on a glass plate. Integrated circuit packages 3 in which integrated elements used for driving the display panel are packed in plastics are attached to a film or printed circuit board 2. Thereafter, the electrodes of the integrated circuit packages 3 and the display panel 1, are connected to each other by wires 4.

In this known EL display device using the conventional integrated circuit package 3, since a film or a printed-circuit board 2 is used as a medium for the connection of the integrated circuit package 3 to the display control circuit (not shown), production cost is increased, and it is cumbersome to make such an EL display device. Further, it is difficult to miniaturize and lighten the EL display device because of the use of the integrated circuit package 3 packed in plastics therein.

In another type of EL display device, as shown in FIGS. 2 and 3, a bare chip 12, not packed in plastics is directly attached on glass plate 11. This is usually called the COG type (Chip-On-Glass type).

In detail, there is provided a soda glass plate 11 on which a protective lqyer 13 is laid. The protective layer 13, a $SiO_2$ layer, is produced by evaporation and has a thickness of about 1500Å. This layer 13 serves to prevent diffusion of Alkali properties of the soda glass plate 11 such as Na and K. On the protective layer 13 is formed a lower electrode 14 which is produced by means of sputtering and photoetching of ITO (Indium Tin Oxide). Thereon, a lower insulating layer 15 of either $Y_2O_3$ or $Si_3N_4$, a fluorescent layer 16 of ZnS : Mn, and an upper insulating layer 17 of either $Y_2O_3$ or $Si_3N_4$ are in turn laid by sputtering. Each of such layers has a thickness of about 3000Å, 5000Åand 3000Årespectively.

On the upper insulating layer 17 are laid upper electrodes 18 which are produced by means of evaporation and photoetching of Al. Layers 18 have a thickness of about 1500Å. At the side of the electrode 14 and on the protective layer 13 is formed a panel lead 19 produced by evaporating Ni spaced from the bare chip 12. Thereafter, a back glass plate of thin film 20 produced by means of photoetching is attached to the soda glass plate 11, and has an exhaust port 20'. A vacuumized space 21 is provided for moisture proofing the insulating layers 15, 17 and the fluorescent layer 16. The space 21 is to be filled with moisture proof insulating oils such as silicon oil or grease through the port 20'. The display novel 23 is completed by sealing the port 20' with sealing material 22.

Further, the unpacked bare chip 12 for driving the display panel is fastened to the end portion of the soda glass plate 11 by use of an adhesive 24 such as epoxy resin or silver-glass paste. The Al electrode 12' of the bare chip 12 and the panel lead 19 are connected to each other by ultrasonic bonding of Al or Au wire 25. The Al or Au wire has a diameter of about 25–30 μm. To protect the bare chip 12 from exterior influences, it is covered with a package 26 made of ceramic or non-metallic material and sealed with special epoxy resin 27. Between the back glass plate 20 and the package 26 is formed a wire support member 28 of glass material produced by means of evaporation or screen printing, whereby the mechanical strength of the Al or Au wire is further increased. The bare chip 12 is connected to display control circuitry through an external lead 29.

This prior COG type EL display device, however, proved in practice to be ineffective and somewhat impractical since it requires the protective layer 13 of $SiO_2$ to protect the bare chip 12 which may be damaged as a result of contact of the soda glass plate 11 with moisture in the atmosphere, followed by the dissociation of Al property from the glass plate 11 and the action of the dissociated Al property upon Al electrode 12 of the bare chip 12.

Further, it has disadvantages that the bare chip 12 may not be fastened rigidly and firmly to the soda glass plate 11 because of the use of the adhesive 24 without the use of special apparatus, that the different heights between the Al electrode 12' of the bare chip 12 and the panel lead 19 make the ultrasonic bonding of Al or Au wire 25 difficult, that the special package 26 is needed to the bare chip 12 from external influences, and that the special wire support member of glass material 28 is needed for increasing the mechanical strength of the Al or Au wire.

SUMMARY OF THE INVENTION

An object of the present invention is to provide an EL display device which overcomes the disadvantages of such prior art, in which a special protective layer of $SiO_2$ is not needed for the rigid and firm attachment of a bare chip. A groove for receiving the chip is formed on the soda glass plate and, thereafter, the chip is attached to and spaced from the bottom of the groove. Ultrasonic bonding is easily achieved since the Al electrode of the bare chip and the panel lead have the same height, and the bare chip is safe from external influence since a vacuum is provided at the outer peripheries thereof.

The present invention will be further described with reference to the accompanying drawings, wherein:

BRIEF DESCRIPTION OF THE DRAWINGS

FIG. 4 is a plan view of an EL display device of the present invention; and

FIG. 5 is an enlarged fragmentary longitudinal view of the EL display device according to the present invention.

DESCRIPTION OF THE PREFERRED EMBODIMENTS

Figure 1:
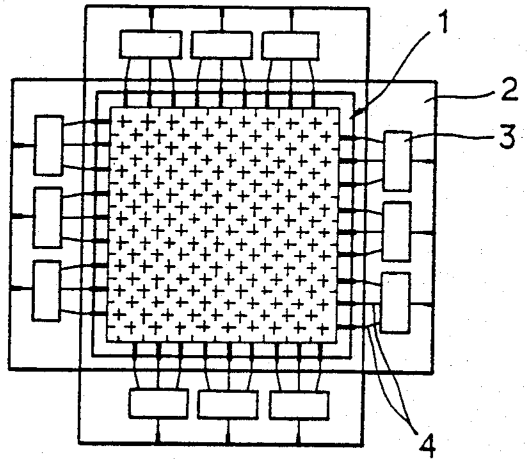
FIG. 1 is a plan view of the known EL display device which uses a conventional integrated circuit.
Figure 2:
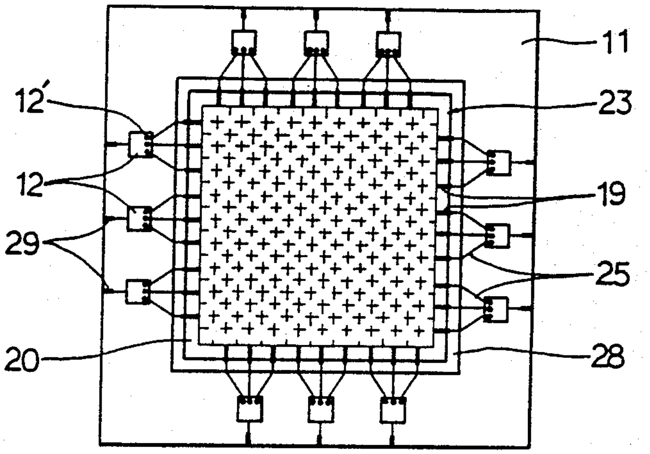
FIG. 2 is a plan view of a known COG type EL display device.
Figure 3:
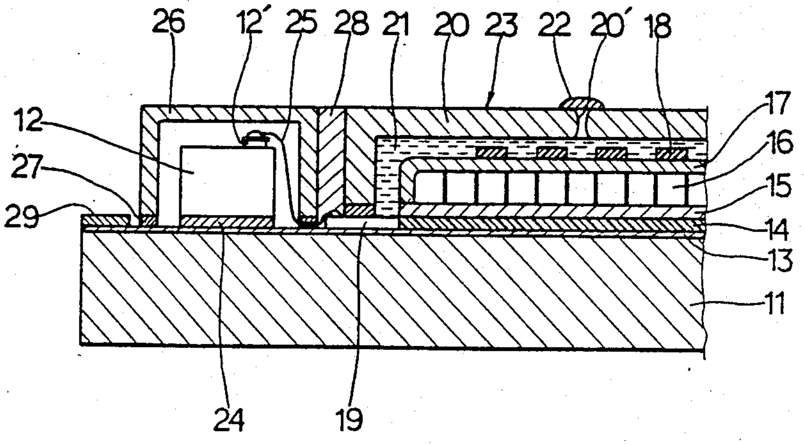
FIG. 3 is an enlarged fragmentary longitudinal view of the known COG type EL display device.

Referring now to FIGS. 4 and 5, there is provided a groove 32 formed in a low Alkali soda glass plate (below Na, K 0.005%) 30, which groove has approximately the same size as a bare chip 31 and firmly receives the bare chip 31 thereinto. The groove 32 is produced by means of photoetching. A lower electrode 33 produced by means of sputtering and photoetching of ITD (Indium Tin Oxide), and having a thickness of about 2000Å, is formed on the soda glass plate 30. On the lower electrode 33 are laid in turn a lower insulating layer 34 of $Y_2O_3$ or $Si_3N_4$, a fluorescent layer 35 of ZnS : Mn, an upper insulating layer 36 of $Y_2O_3$ or $Si_3N_4$. Such layers are produced by means of sputtering and each layer has a thickness of about 3000Å, 5000Å, and 3000Årespectively. On the upper insulating layer 36 is formed upper electrode 37 which is produced by means of evaporation and photoetching of Al and has a thickness of about 1500Å. Thereafter, at the beside the lower electrode 33 and on the soda glass plate 30 a panel lead 38 is formed by means of photoetching of Ni spaced from the bare chip 31.

To the inner periphery of the bottom of the grooves 32 is applied epoxy resin 39. Thus, the bare chip 31 is fittingly received in the groove 32 spaced from the bottom thereof. The Al electrode 31' of the bare chip 31 has the same height as that of a panel lead 38 and Al or Au wire is bonded to them at both ends thereof by means of ultrasonic bonding. Spacers 42, 42' having a predetermined height are provided between the groove 32 and the panel lead 38, and at the upper inner peripheries of the soda glass plate 30 respectively. One end of the spacers 42, 42' is attached to the soda glass plate 30 and the other end to the back glass plate 44 by the use of light curable resin. To the upper part of the spacers 42, 42' is fastened a back glass plate 44 having exhaust ports 44', 44" therein by use of a light curable resin 43. Spaces 45, 45' are vacuumized and one space 45 is filled with moisture-proof insulating oil such as silicon oil or grease through an exhaust port 44', thereafter the ports 44', 44" are sealed with sealing material 46. The outer peripheries of the spacer 42' are coated with epoxy resin 47 for increasinng the strength of this display device. The bare chip 31 is connected to a display control circuit through an external lead 48.

According to this invention, the bare chip 31 is fittingly received in and firmly attached to the groove 32 formed in the soda glass plare 30, and the dissociation of the Alkali properties from soda glass plate 30 and the diffusion of the Alkali properties to the bare chip 31 are prevented without forming a special protective layer since a predetermined space is maintained between the bare chip 31 and the bottom of the groove 32. Also: the ultrasonic bonding of the Al or Au wire 40 is easily achieved since the Al electrode 31' of the bare chip 31 has the same height as that of the panel lead 38; the back glass plate 44 does not require photoetching for attachment; a support member is not required for increasing the mechanical strength of Al or Au wire 40 since spacers 42 increase the mechanical strength of Al or Au wire; and the bare chip 31 is safe from external influences since it is in a vacuum.

The manufacturing method according to the present invention was described above with regard to an EL display device only, but the method is also applicable to liquid crystal displays, plasma display panels or vacuum fluorescent display.

I claim:

1. In a method of manufacturing a display device including a display portion, a panel lead, a glass plate, and a bare chip, the improvement comprising:

forming a groove in said glass plate for receiving said bare chip therein;

forming said panel lead on said glass plate for electrical connection thereof to said display portion of said device;

securing said bare chip in said groove such that an electrode of said chip and said panel lead are substantially at the same height;

electrically connecting said electrode and said panel lead;

providing at least one spacer on said glass plate with a seal between said at least one spacer and said glass plate and extending about said bare chip, said at least one spacer permitting electrical connection of said electrode and said panel lead;

providing a plate on said at least one spacer spaced from said bare chip with a seal between said plate and said at least one spacer;

said glass plate, said at least one spacer and said plate defining an enclosure for said bare chip; and vacuum sealing said enclosure to vacuum seal said bare chip therein.

2. The method of claim 1 wherein the step of securing said bare chip in said groove includes application of an epoxy resin to the periphery of said groove such that said bare chip is supported in said groove spaced from the bottom of said groove.

3. The method of claim 2 wherein the step of securing said bare chip in said groove spaced from the bottom thereof is accomplished without a protective layer therebetween.

4. The method of claim 1 wherein the step of sealing said bare chip includes forming an exhaust port in said plate communicating with said enclosure and forming a vacuum through said port.

5. The method of claim 4 wherein said port is sealed with a sealing material and the outer periphery, relative to said device, of said at least one spacer is coated with an epoxy resin.

6. In a method of manufacturing a display device including a display portion, a panel lead, a glass plate, and a bare chip, the improvement comprising:

forming a groove in said glass plate for receiving said bare chip therein;

forming said panel lead on said glass plate for electrical connection thereof to said display portion of said device;

securing said bare chip in said groove such that an electrode of said chip and said panel lead are substantially at the same height;

electrically connecting said electrode and said panel lead;

providing at least one spacer on said glass plate with a seal between said at least one spacer and said glass plate and extending about said bare chip and said display portion, said at least one spacer permitting electrical connection of said electrode and said panel lead;

providing a plate on said at least one spacer extending over and spaced from said bare chip and extending over said display portion with a seal between said plate and said at least one spacer;

said glass plate, said at least one spacer and said plate defining a first enclosure for said bare chip and a second enclosure in said display portion;

vacuum sealing said first enclosure to vacuum seal said bare chip therein; and sealing said second enclosure in said display portion.

7. The method of claim 6 wherein the step of securing said bare chip in said groove includes application of an epoxy resin to the periphery of said groove such that said bare chip is supported in said groove spaced from the bottom of said groove.

8. The method of claim 7 wherein the step of securing said bare chip in said groove spaced from the bottom thereof is accomplished without a protective layer therebetween.

9. The method of claim 6 wherein the step of sealing said bare chip includes forming an exhaust port in said plate communicating with said first enclosure and forming a vacuum through said port.

10. The method of claim 9 wherein said port is sealed with a sealing material and the outer periphery, relative to said device, of said at least one spacer is coated with an epoxy resin.

* * * * *